United States Patent Office 2,722,171
Patented Nov. 1, 1955

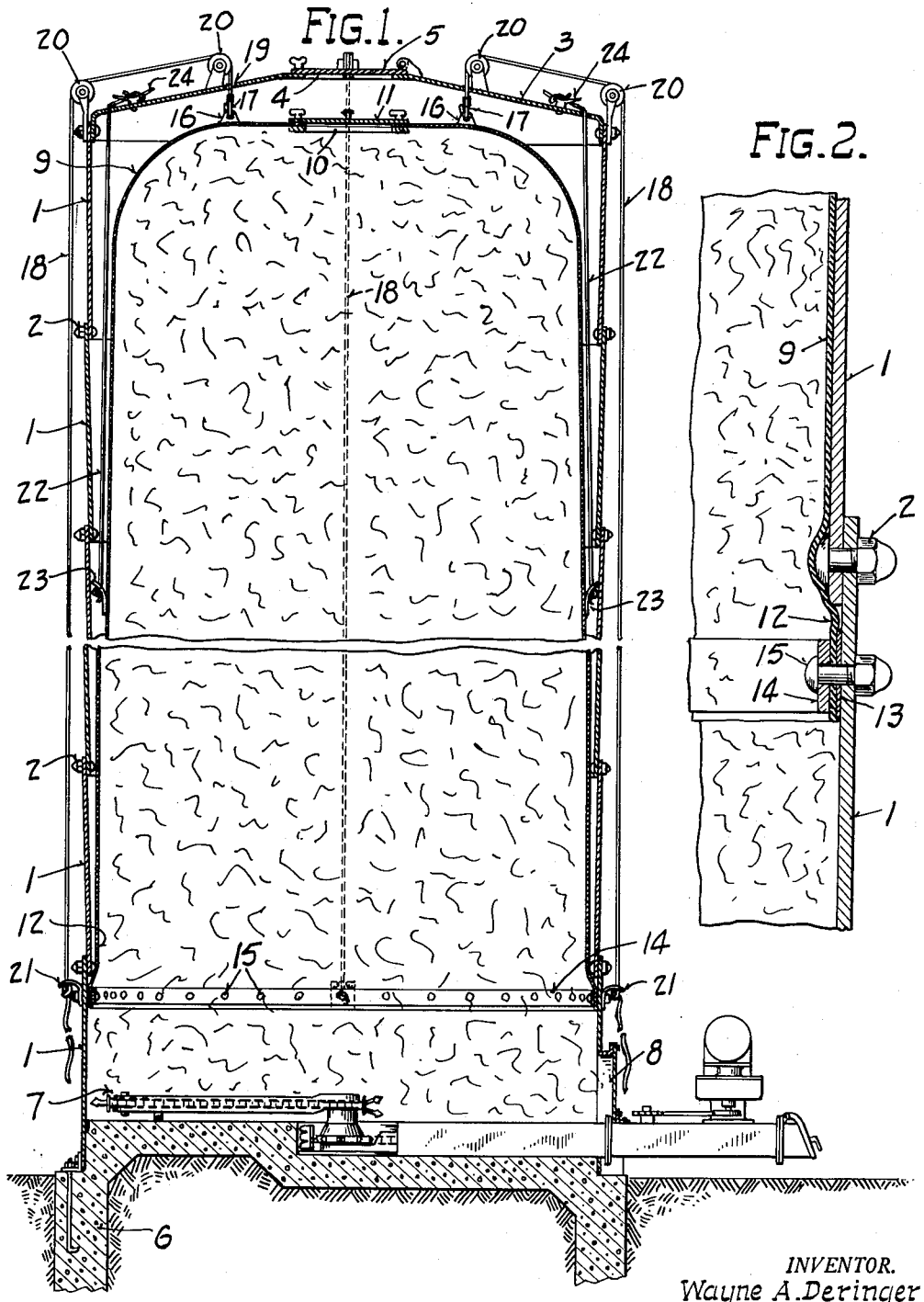

2,722,171
SILO

Wayne A. Deringer, Milwaukee, Wis., assignor to A. O. Smith Corporation, Milwaukee, Wis., a corporation of New York Application August 1, 1951, Serial No. 239,652

4 Claims. (Cl. 99—235)

This invention relates to an improved structure, such as a silo, for storing crops and the like for animal consumption, and particularly to a flexible member assembled with the structure for preserving the freshness of products stored within the flexible member until the same have been used. The invention is described and illustrated as a generally cylindrical metal silo in which forage crops for animals are stored and transformed into silage.

Within a relatively short time after green crops have been placed in a silo, fermentation begins and the plant cells begin to respire which results in a process of gaseous diffusion between the intercellular spaces of plant tissue and the atmosphere. In the gases produced by this process there are generally large quantities of carbon dioxide and if any appreciable amount of this gas escapes, and is replaced by air, the free oxygen will tend to promote mold growth in the silage thereby leading to deterioration of the latter.

After the initial phase of fermentation is completed, when substantial amounts of gases are given off by the stored crops, fermentation may continue for an appreciable time, but at a much slower rate. If the air which enters the silo may be limited to small amounts, the silage will generally absorb the same so that oxidation of the silage is arrested, thereby substantially preventing mold growth and enhancing the preservation of the silage.

Various means have been employed to control the pressure within a silo, the pressure being subject to variations due to temperature changes and barometric changes, and these means have generally been employed with a silo which has been fabricated to be substantially air-tight. The exterior structure of the silo of the present invention is preferably not of the air-tight type.

An object of this invention is to provide a storage structure of relatively large capacity which incorporates means for substantially enveloping crops within the structure to prevent substantial amounts of air from coming into contact with crops, the storage structure being of the type in which a portion of the stored crops are removed at periodic intervals as distinguished from a structure in which the stored products are all removed at one time.

Another object is to provide a silo for storing crops which may be erected without regard to making the seams between the sections of the silo air-tight.

Another object is to provide a silo for storing crops which incorporates a bag-like structure within the silo which is flexible and which is impervious to gas and moisture.

A further object is to provide a bag of the above type which may be readily replaced when and if necessary with a minimum amount of labor.

Another object is to provide a silo for storing crops which may be unloaded from the bottom by mechanical means and in which a bag-like envelope is disposed within the interior of the structure in a manner which does not interfere with the unloading mechanism.

These and other objects will appear from the following description when read in connection with the drawing in which:

Figure 1 is a vertical sectional view of the structure of the invention depicting the disposition of the impervious bag relative to the silo and the forage crops, with the silo in a filled condition; and Fig. 2 is a detail vertical sectional view showing a wall joint and bag attachment.

The silo comprises a plurality of cylindrical sections 1 which are disposed one on top of the other and secured together at joints 2. A cover 3 encloses the top of the silo and is provided with an opening 4 to receive forage crops from a filler pipe, not shown. The opening 4 is closed by a a cover plate 5 which is preferably hingedly secured to the cover 3. The base of the silo is secured to a foundation 6 of cement or the like which extends a substantial depth into the ground below the silo proper to securely anchor the same.

The sections 1 are of suitable gauge metal, and these together with cover 3 are preferably coated with a lining of vitreous enamel to protect the metal from corrosion. The joints 2 may be provided with a layer of non-abrasive cloth or the like, if desired, to prevent the enamel lining from chipping but it is unnecessary to make the joints themselves air-tight because in effect they may be regarded as being sealed by virtue of a flexible bag disposed within the structure as will be described subsequently.

The silage may be removed from the bottom of the silo by a mechanical unloader 7 shown schematically. A door 8 is provided in the lowest cylindrical section of the silo and provides access to the interior of the silo.

Although the silo above described has a cover disposed at the top thereof, the impervious bag which protects the silage, and which is hereinafter described, may be used with an open top structure should weather conditions permit.

A flexible bag 9 impervious to gas (which includes the air outside the structure and gases inside) and moisture which may be made of vinyl chloride or similar inert plastic material is disposed within the silo in a manner to substantially enclose the silage disposed therein. The bag 9 may also be made of cloth impregnated with rubber or flexible resin or of paper treated to be substantially airtight. The bag preferably should be of a material that is inexpensive so that it may be expendable from year to year if necessary.

The top of the bag is provided with an opening 10 which is aligned with opening 4 in the cover of the silo so that chopped or shredded crops may be received within the bag. An air-tight cover 11 is secured in any suitable manner to the top of the bag and serves to close the same after the introduction of crops therein.

The bottom 12 of the bag 9 may be secured circumferentially to the inner surface of the silo in any suitable air-tight manner as by cementing the two members together or, as illustrated, the bottom circumferential edge of the bag may be provided with a mastic sealing band 13. The edge of the bag is interposed between the silo wall and a clamping ring 14 which is removably secured to the silo wall below its lowermost joint 2 by a number of spaced bolts 15. The bolts 15 pass through aligned apertures in the ring 14, the lower edge of bag 9, and the lowest section 1 of the silo. The clamping ring 14 may be made in several sections for ease of handling and utility. Where the material of the bag is of a sealing nature of mastic 13 may be omitted.

To complete the seal of bag 9 and prevent air from being admitted thereto except during intervals of unloading, the lowermost section 1 of the silo is sealed to the foundation 6 and the door 8 is made substantially air-tight.

A plurality of spaced grommets 16 are secured to the top of bag 9 in air-tight fashion. Hooks 17 are disposed at the one end of lines 18 to engage corresponding grommets 16. The lines 18 pass through apertures 19 in cover 3 and are disposed over pulleys 20 and downwardly along the outer side of the silo so that bag 9 may be manipulated from outside the silo to raise the same for filling.

Cleats 21 are provided around the outer surface of the lowermost cylindrical section of the silo, so that the lines 18 may be secured thereon for support of the bag during filling.

In filling the silo with forage crops the impervious bag 9 is raised to the top of the silo by the lines 18. The covers 5 and 11 are opened and the filter spout inserted through the openings 4 and 10 to fill the bag 9. When filled, the bag presses outwardly against the silo sections 1 as shown in Fig. 2, the representation of Figure 1 being merely for better illustration of the bag supporting elements. After filling, the lines 18 are released from cleats 21, so that the bag rests on the top of the silage and is free to move downwardly as the silage is withdrawn from the silo.

During the fermentation cycle any pressure built up within the flexible bag will cause the sides thereof to expand against the sides of the silo, with the bag acting as a liner for the silo to aid in preventing the escape of the gases of fermentation. On the other hand, the outer structure serves as a support for a silo of sealed flexible walls to support the walls against the weight of the contents disposed therein.

As the silage is removed from the bottom of the silo, the bag 9 falls with the silage so that the greater amount of the silage is protected at all times from air. Being flexible, the bag will yield to pressure changes within the silo due to changes in temperature or because of barometric changes without injury to the bag.

In order to prevent the bag from falling the entire distance to the bottom of the silo and being damaged by the unloading mechanism 7, a plurality of ropes 22 are provided between the silo wall and the bag. The ropes 22 are secured, respectively, to grommets 23 spaced circumferentially of the bag and to corresponding cleats 24 provided on the silo cover 3. The grommets 23 are located a sufficient distance above the center of the bag 9 to prevent the top of the bag from interfering with the unloading mechanism 7 when the silo is substantially empty.

When the silo has been emptied of its contents, access to the interior of the silo may be had through the door 8 so that the bag may be inspected to determine if it is necessary to replace the same or to effect repairs. If it is desired to replace the bag, the bolts 15 and clamping ring 14 are removed and the lower edge of the bag is disengaged from the silo wall. The ropes 22 are then lowered and untied from grommets 23 and ropes 18 are unhooked from grommets 16 so that the bag may be removed through the door 8.

In putting in the new bag, the ropes 18 are secured to grommets 16, after which ropes 22 are secured to grommets 23. The ropes 18 are then raised until the bottom edge of the bag is substantially in registry with the holes for bolts 15. The edge of the bag is then sealed to the silo wall and the bolts 15 and ring 14 are replaced as described. To complete the installation of the bag and to prepare for the refilling thereof, the ropes 22 are tightened and secured to cleats 24 and the cover members 5 and 11 are opened for insertion of a filler pipe.

The invention has been described in connection with a metal silo having a flexible gas-impervious bag disposed therein whereby the bag constitutes a flexible liner for the silo to prevent the gases of fermentation from escaping and also constitutes a gas-impervious enclosure around the crops stored therein to prevent air from coming into contact with the greater portion of the crops stored therein. It is to be understood that the bag itself also constitutes a flexible silo which is supported outwardly from the sides thereof by a generally rigid supporting structure. The bag may be of any desired shape and the surrounding supporting structure may be of any suitable configuration to afford support to the walls of the bag against the weight of the silage. The flexibility of the bag permits it to collapse in accordance with the increments of silage removed from the bottom of the silo. The provision of a gas-impervious bag utilized in a manner set forth above provides a structure for the storage of forage crops whereby the freshness of the crops stored therein is maintained until the same are unloaded from the bottom of the structure.

Although the invention has been described in connection with a bottom unloaded silo structure the invention also is directed to sealing a silo which is unloaded from the top in which case the bag liner would be inverted from the position it would have in the case of a bottom unloaded structure.

Various embodiments of the invention may be employed within the scope of the following claims.

I claim:

1. In a container for the storage of forage crops, a large supporting structure shaped to define a chamber therein, a sealed air-tight flexible bag of substantially similar configuration and equal capacity to that of the chamber disposed within said chamber and supported by said structure against pressures resulting from the presence of forage crops within the bag, the upper portion of the bag resting on the forage crops and falling therewith during unloading, means disposed at the lower portion of the container to unload portions of the forage crops at spaced intervals, and means external to the bag adapted to prevent the bag from falling into engagement with said unloading means and interfering with the proper functioning thereof.

2. In a container for the storage of forage crops, a large supporting structure shaped to define a chamber therein, a sealed air-tight flexible bag of substantially similar configuration and equal capacity to that of the chamber disposed within said chamber and supported by said structure against pressures resulting from the presence of forage crops within the bag, the upper portion of the bag resting on the forage crops and falling therewith during unloading, means disposed at the lower portion of the container to unload portions of the forage crops at spaced intervals, means to elevate the bag from a collapsed condition and to dispose the bag for filling, and means external to the bag adapted to prevent the bag from falling into engagement with said unloading means during emptying and interfering with the proper functioning thereof.

3. A silo for the storage of forage crops comprising a flexible inverted bag impervious to air and moisture and having the bottom end open and the top end normally closed, an opening disposed in the top end of the bag and provided with an air-tight closure therefor, a substantially rigid cylindrical structure having an unloading means at the bottom thereof, said rigid structure being of substantially similar configuration and equal capacity to that of the bag and being adapted to reinforce the flexible bag from pressure caused by fermentation gases from crops stored in said bag, said bag being secured circumferentially in air-tight engagement to the inner surface of the reinforcing structure at a point adjacent the unloading means, and means external to the bag to prevent said bag from falling into engagement with said unloading means during emptying and interfering with the proper functioning thereof.

4. A structure for the storage of forage crops whereby excessive amounts of air are prohibited from coming into contact with the crops stored therein, comprising a container of generally cylindrical shape and having a plurality of sections disposed one on top of the other with joints disposed between each successive pair of sections, a top on said container and having an opening disposed therein, a foundation for supporting and sealing the container at the bottom thereof, an inverted open-end flexible bag of substantially similar configuration and equal capacity to that of the container disposed within the container and being impervious to gas and moisture, an opening in the upper portion of said bag aligned with the opening in the top of said container, an air-tight cover to close the opening in said bag, unloading means disposed in the bottom of the container for delivery of the stored materials through an opening in the container disposed adjacent the bottom thereof, means disposed below the lowermost joint of said container and extending circumferentially thereof to removably secure the open end of said bag in air-tight engagement with said container, means removably secured to the opposite end of said bag to elevate the same for reception of forage crops through the opening therein, and means external to the bag adapted to prevent said bag from interfering with said unloading means when the structure is substantially empty.

References Cited in the file of this patent

UNITED STATES PATENTS

| | | |
|---|---|---|
| 135,172 | Tiffany | Jan. 21, 1873 |
| 283,137 | Nevius | Aug. 14, 1883 |
| 1,448,226 | Mattson | Mar. 13, 1923 |
| 1,666,666 | Pew | Apr. 17, 1928 |
| 2,432,025 | Lorenz | Dec. 2, 1947 |
| 2,490,767 | Allen | Dec. 13, 1949 |
| 2,551,216 | Martin | May 1, 1951 |
| 2,551,217 | Martin | May 1, 1951 |